US007358635B2

(12) United States Patent
Fout et al.

(10) Patent No.: US 7,358,635 B2
(45) Date of Patent: Apr. 15, 2008

(54) MAGNETIC POWER TRANSMISSION DEVICES FOR OILFIELD APPLICATIONS

(75) Inventors: Gary E. Fout, Cypress, TX (US); Bruce Densmore, Seattle, WA (US)

(73) Assignee: M-I L.L.C., Houston, TX (US)

( * ) Notice: Subject to any disclaimer, the term of this patent is extended or adjusted under 35 U.S.C. 154(b) by 458 days.

(21) Appl. No.: 10/401,264

(22) Filed: Mar. 27, 2003

(65) Prior Publication Data

US 2005/0194853 A1 Sep. 8, 2005

Related U.S. Application Data

(60) Provisional application No. 60/369,296, filed on Apr. 2, 2002.

(51) Int. Cl.
*H02K 49/00* (2006.01)

(52) U.S. Cl. ........................................ 310/103; 310/80

(58) Field of Classification Search .................. 310/17, 310/20, 80, 75 D, 103, 62–63
See application file for complete search history.

(56) References Cited

U.S. PATENT DOCUMENTS

| | | | | | |
|---|---|---|---|---|---|
| 2,408,851 | A | * | 10/1946 | Hillier et al. | 417/43 |
| 3,890,515 | A | | 6/1975 | Fehr et al. | 310/104 |
| 4,163,914 | A | * | 8/1979 | Keyes | 310/103 |
| 4,487,299 | A | * | 12/1984 | Bookout | 188/313 |
| 5,180,955 | A | * | 1/1993 | Karidis et al. | 318/568.1 |
| 5,477,093 | A | * | 12/1995 | Lamb | 310/75 D |
| 5,695,015 | A | * | 12/1997 | Barr et al. | 175/45 |
| 5,857,955 | A | | 1/1999 | Phillips et al. | |
| 5,880,548 | A | * | 3/1999 | Lamb | 310/103 |
| 6,043,578 | A | * | 3/2000 | Lamb | 310/92 |
| 6,283,303 | B1 | | 9/2001 | Lane et al. | |
| 2003/0010491 | A1 | * | 1/2003 | Collette | 166/65.1 |

FOREIGN PATENT DOCUMENTS

| | | | |
|---|---|---|---|
| WO | WO-98/47215 | A1 | 10/1998 |
| WO | WO 9847215 | A1 | 10/1998 |

OTHER PUBLICATIONS

Official Examination Report issued on corresponding Argentine Patent Application No. AR 039230 A1, which corresponds to Application No. P 03 01 01154, which is based on U.S. Appl. No. 60/369,296 and others; Dated Oct. 20, 2006; 5 pages (Not in English).

* cited by examiner

*Primary Examiner*—Thanh Lam
(74) *Attorney, Agent, or Firm*—Osha Liang LLP

(57) ABSTRACT

A method and apparatus relates to incorporating a magnetic coupling for use in oilfield applications. The magnetic coupling is operatively coupled to an oilfield machine to provide a controlled operational speed. The magnetic coupling may be operatively connected to a motor and a drive shaft where a speed of rotation of the drive shaft is controlled by an operation of the magnetic coupling. The drive shaft is operatively connected to the oilfield machine.

6 Claims, 1 Drawing Sheet

MAGNETIC POWER TRANSMISSION DEVICES FOR OILFIELD APPLICATIONS

CROSS-REFERENCE TO RELATED APPLICATIONS

This application claims priority from U.S. patent application Ser. No. 60/369,296, filed on Apr. 2, 2002. Furthermore, this application incorporates by reference herein the subject matter of U.S. patent application Ser. No. 60/369,296.

BACKGROUND OF INVENTION

When drilling in earth formations, the control (i.e., processing and handling) of solid materials (such as "cuttings"-pieces of a formation dislodged by the cutting action of teeth on a drill bit) is of great importance. A variety of machines, such as shakers, centrifuges, blowers, pumps (including mud pumps), agitators, mixers, draw works, conveyors, etc. are used in the processing and handling of solid materials created during the drilling or completion stage. Combinations of these machines may also be used and such machines are well known in the art.

A typical concern, for example, is how to handle cuttings from the formation being drilled. After the cuttings have been transported to the surface of the well by a flow of a drilling fluid, disposal of the cuttings may pose a problem, particularly when the drilling fluid is oil-based or hydrocarbon-based. The oil from the drilling fluid (as well as any oil from the formation) often becomes associated with or adsorbed to the surfaces of the cuttings. The cuttings are then an environmentally hazardous material, making disposal a problem especially in environmentally sensitive areas such as offshore operations.

U.S. Pat. No. 5,857,955 discloses one prior art centrifuge for use in oilfield applications. In particular, a centrifuge may be used to aid in the removal of dirt, sand, shale, abrasive cuttings, and/or silt particles from drilling fluid after the fluid has been circulated through a well so as to lift cuttings and other debris to the surface in an oilfield drilling operation. Moreover, U.S. Pat. No. 6,283,303 discloses a vibrating screen separator including an elongated, box-like, rigid bed, and a screen attached to, and extending across, the bed. The bed vibrates as the material to be separated is introduced to the screen, and the screen retains relatively large size material and passes the liquid and/or relatively small material into the bed. The bed can be vibrated by pneumatic, hydraulic, or rotary vibrators, and other means known in the art.

Operational control of the power transmission and forces (such as torque, conveyor speed, pump rate, etc.) involved with the types of oilfield devices such as those listed above is important to ensure efficient operation and to avoid failure of, for example, couplings and the like. Adjusting the rotational speed of (and the torque applied to) the drive shaft allows a user to maintain predetermined optimum operating conditions, regardless of variances in the flow rate of the feed slurry. Such techniques using variable speed AC motors are known in the art. However, such variable speed motors may be quite expensive. In particular, U.S. Pat. No. 5,857,955 (assigned to the assignee of the present invention and incorporated by reference herein) discloses one prior art variable speed AC motor. It is expressly within the scope of the present invention that other rare earth, permanent magnets may be used other than those described herein.

Therefore, what is needed are devices and methods that improve the reliability, safety, and/or energy efficiency of oilfield machinery.

SUMMARY OF INVENTION

According to one aspect of one or more embodiments of the present invention, the present invention relates to an apparatus for use in oilfield applications comprising a magnetic drive operatively coupled to an oilfield machine to provide a controlled operational speed.

According to one aspect of one or more embodiments of the present invention, the present invention relates to an apparatus for use in oilfield applications comprising a magnetic coupling operatively connected to an oilfield machine that provides over-torque protection.

According to one aspect of one or more embodiments of the present invention, the present invention relates to a method for controlling an oilfield machine comprising controlling an operational speed of the oilfield machine by the operation of a magnetic coupling.

According to one aspect of one or more embodiments of the present invention, the present invention relates to a method for controlling torque in an oilfield machine comprising controlling an operational speed of the oilfield machine by the operation of a magnetic coupling where the controlling controls the torque.

According to one aspect of one or more embodiments of the present invention, the present invention relates to an apparatus for use in an oilfield application comprising means for magnetic coupling; means for rotating an input of the means for magnetic coupling; means for transmitting a rotational output of the means for magnetic coupling; and means for coupling the means for transmitting to the oilfield application.

Other aspects and advantages of the invention will be apparent from the following description and the appended claims.

DETAILED DESCRIPTION

Figure 1:
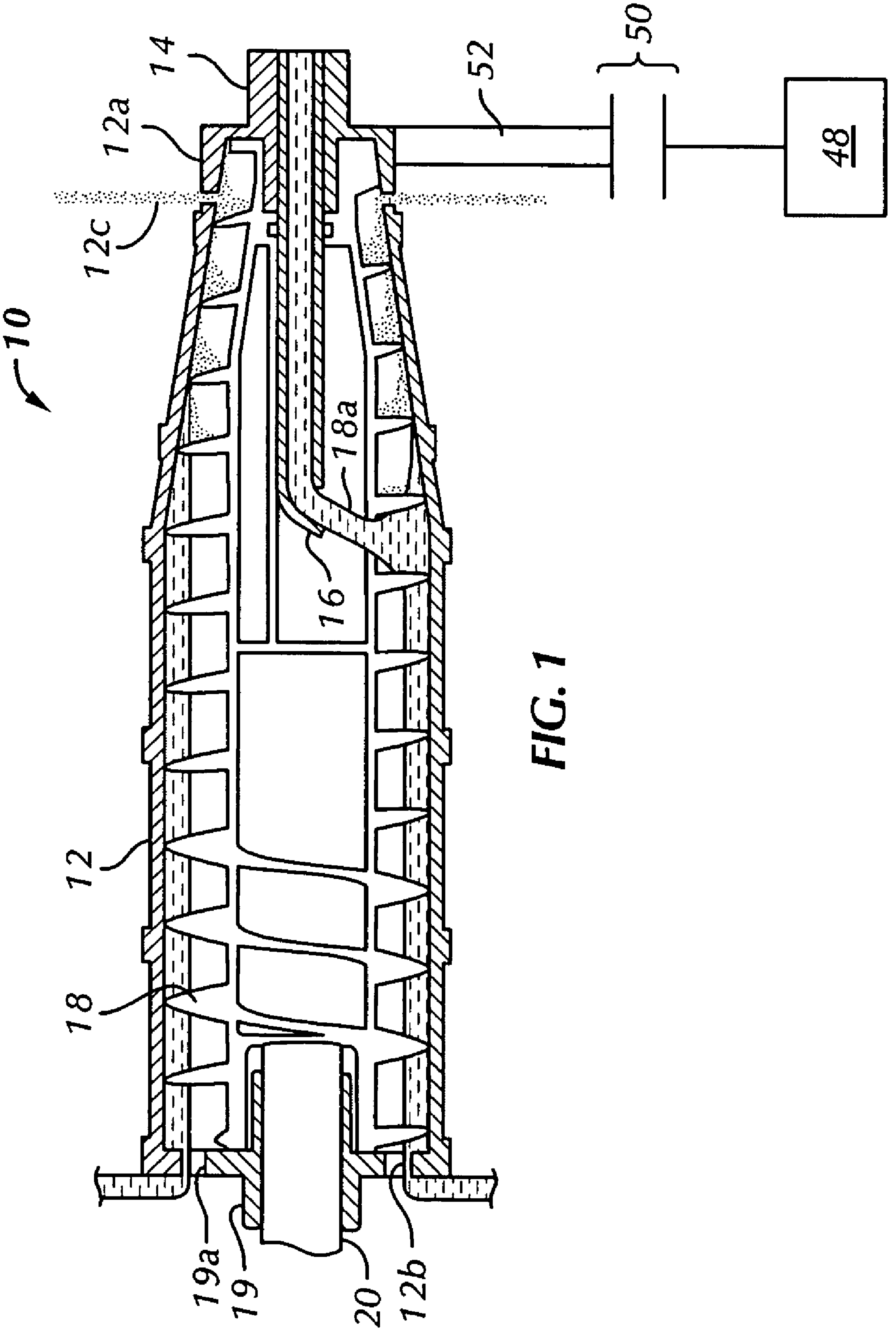
FIG. 1 shows a sectional view of a centrifuge according to one embodiment of the present invention.

The present invention relates to incorporating magnetic power-transmission devices in oilfield machinery. In some embodiments, high-powered, rare earth permanent magnets are used as power transmission devices. In particular, in some embodiments, the present invention incorporates the permanent magnets as over-torque protection couplings in oilfield machines such as shakers, centrifuges, blowers, pumps (including mud pumps), agitators, mixers, waste treatment equipment, conveyors, etc. Co-pending U.S. application Ser. No. 10/051,438 (assigned to M-I L.L.C) discloses one suitable waste treatment apparatus for use with the magnetic power transmission drives discussed herein.

In other embodiments, the permanent magnets are incorporated as power transmission drives in oilfield machines such as shakers, centrifuges, blowers, pumps (including mud pumps), agitators, waste management equipment, draw works, top drive assemblies, mixers, conveyors, etc. Suitable permanent magnetic couplings and power transmission drives are disclosed, for example, in U.S. Pat. Nos. 6,337,527; 6,242,832; 6,072,258; 6,043,578; 6,005,317; 5,909,073; 5,903,075; 5,880,548; 5,834,872; 5,739,627; 5,712,520; 5,712,519; 5,691,587; 5,668,424; 5,477,094; 5,477,093 and 5,473,209. These patents are hereby incorporated by reference. Further, this application incorporates the subject matter of co-pending U.S. patent application Ser. Nos. 09/811,343; 09/898,917; 09/898,912.

The use of magnetic power transmission drives and over-torque protection couplings with oilfield machines generally provides improved reliability, safety and energy efficiency in operating systems. Note that the machinery listed herein is not intended to be limiting because the magnetic power transmission devices may be used with other oilfield machinery known in the art.

Referring to FIG. 1, one embodiment of the present invention comprises a centrifuge 10. The centrifuge 10 includes an elongated bowl 12 supported for rotation about a longitudinal axis thereof. The bowl 12 has two open ends 12*a* and 12*b*, with the open end 12*a* adapted to receive a drive flange 14 that is connected to a drive shaft (not shown) for rotating the bowl 12. A longitudinal passage extends through the drive flange 14 for receiving a feed tube 16 that introduces a feed slurry (not shown) including, e.g., drill cuttings into the interior of the bowl 12.

A screw conveyor 18 extends within the bowl 12 in a coaxial relationship thereto and is supported for rotation within the bowl 12 in a manner to be described below. To this end, a hollow flanged shaft 19 is disposed in the end 12*b* of the bowl 12 and receives a drive shaft 20 of an external planetary gear box (not shown in FIG. 1) for rotating the screw conveyor 18 in the same direction as the bowl but at a different speed. One or more openings 18*a* extend through the wall of the conveyor 18 near the outlet end of the tube 16 so that the centrifugal forces generated by the rotating bowl 12 causes the slurry to gravitate radially outwardly and pass through the openings 18*a* and into the annular space between the conveyor 18 and the bowl 12.

The liquid portion of the slurry is displaced to the end 12*b* of the bowl 12 while the entrained solid particles in the slurry settle towards the inner surface (not separately numbered) of the bowl 12 because of the gravitational forces generated, and are scraped and displaced by the screw conveyor 18 back towards the end 12*a* of the bowl 12 for discharge through a plurality of discharge ports 12*c* formed through the wall of the bowl 12 near its end 12*a*. A plurality of openings 19*a* (two of which are shown) are provided through the flanged portion of the shaft 19 for discharging the separated liquid. This type of centrifuge is known in the art and, although not shown in the drawings, it is understood that the centrifuge 10 would be enclosed in a housing or casing, also in a conventional manner.

In this embodiment, a permanent, magnetic coupling 50 is used to transmit torque to the centrifuge 10. The magnetic coupling 50 is connected to both a motor 48 and a drive shaft 52. Power is transferred from the motor 48 to the drive shaft 52 by operation of the magnetic coupling 50, which is described in detail below. A suitable coupling, incorporating a permanent, rare-earth magnet, in particular a NdFeB magnet, is sold under the name MagnaDrive Adjustable Speed Drive, sold by MagnaDrive Inc., of Port Angeles, Wash. is operatively connected to the centrifuge 10 to enable continual variation of the speed and the torque applied to a drive shaft 52.

In one embodiment, the magnetic coupling 50 is connected to a drive shaft 52 of the centrifuge 10, which in turn, may be coupled to the bowl 12. The MagnaDrive Adjustable Speed Drive comprises a precision rotor assembly containing high-energy permanent magnets and a copper conductor assembly. Relative motion between the magnets and copper rings creates a magnetic field that transmits torque across an air gap. Varying the width of the gap changes the coupling force, producing a controlled and infinitely variable output speed.

Further, it is expressly within the scope of the present invention that rare earth, permanent magnets may be used in other oilfield applications other than the above described embodiment. In particular, these drives may be used in shakers, blowers, waste treatment equipment, waste management equipment, pumps (including mud pumps), agitators, draw works, top drive assemblies, mixers, conveyors, and a variety of other oilfield equipment.

Advantages of embodiments of the present invention may include one or more of the following; reduction of fire danger (because the magnetic drives and couplings do not require an external power source), reduction of "hard starts," reduction of vibration associated with power transfer, etc.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus for use in oilfield applications, comprising:

a magnetic coupling operatively connected at a first end to an oilfield machine to provide a controlled operational speed, wherein the magnetic coupling incorporates a permanent, rare-earth magnet; and a drive shaft operatively coupled between the magnetic coupling and the oilfield machine, wherein the speed of rotation of the drive shaft is controlled by the operation of the magnetic coupling, wherein the magnetic coupling produces a controlled and infinitely variable output speed in the drive shaft.

2. The apparatus of claim 1, wherein the oilfield machine comprises at least one machine selected from the group consisting of shakers, blowers, waste treatment equipment, waste management equipment, centrifuges, pumps, mud pumps, draw works, top drive assemblies, agitators, mixers, and conveyors.

3. The apparatus of claim 1, further comprising:

a motor operatively connected to a second end of the magnetic coupling.

4. An apparatus for use in oilfield applications, comprising:

a motor;

a drive shaft; and a magnetic coupling to provide over-torque protection, wherein the magnetic coupling is operatively connected between the motor and the drive shaft, wherein the magnetic coupling incorporates a permanent, rare-earth magnet wherein a speed of rotation of the drive shaft is controlled by an operation of the magnetic coupling, and wherein the drive shaft is operatively connected to an oilfield machine, wherein the oilfield machine comprises at least one machine selected from the group consisting of shakers, blowers, waste treatment equipment, waste management equipment, centrifuges, pumps, mud pumps, draw works, top drive assemblies, agitators, mixers, and conveyors.

5. The apparatus of claim 4, wherein the magnetic coupling drives a substantially constant speed load.

6. The apparatus of claim 4, wherein the magnetic coupling produces a controlled and infinitely variable output speed.

* * * * *